J. L. Knowlton,
Reciprocating Saw Mill.
No. 2,072. Reissued Sep. 12, 1865.
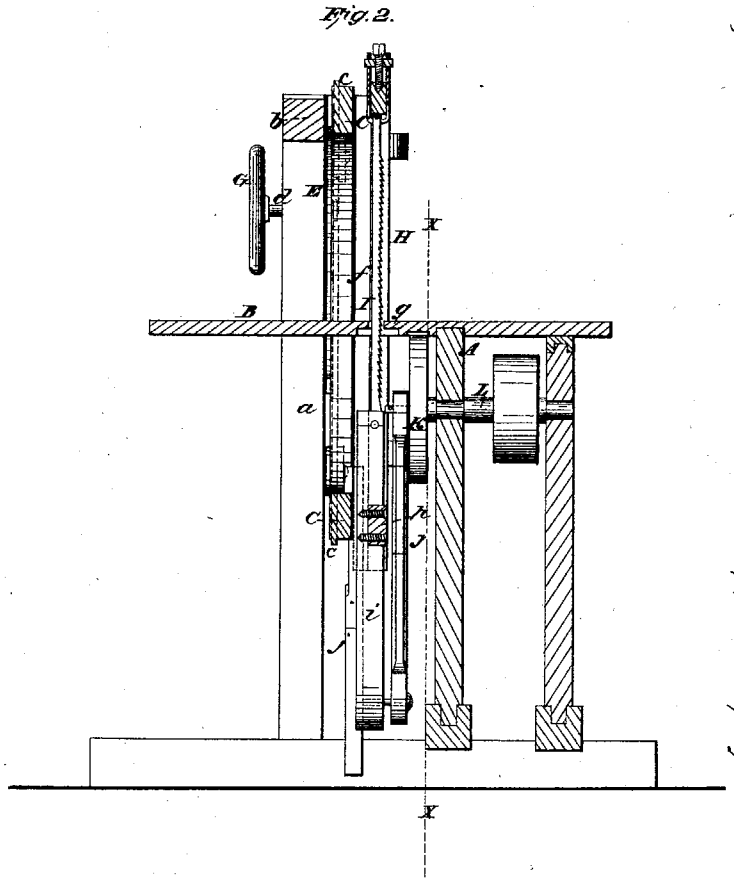
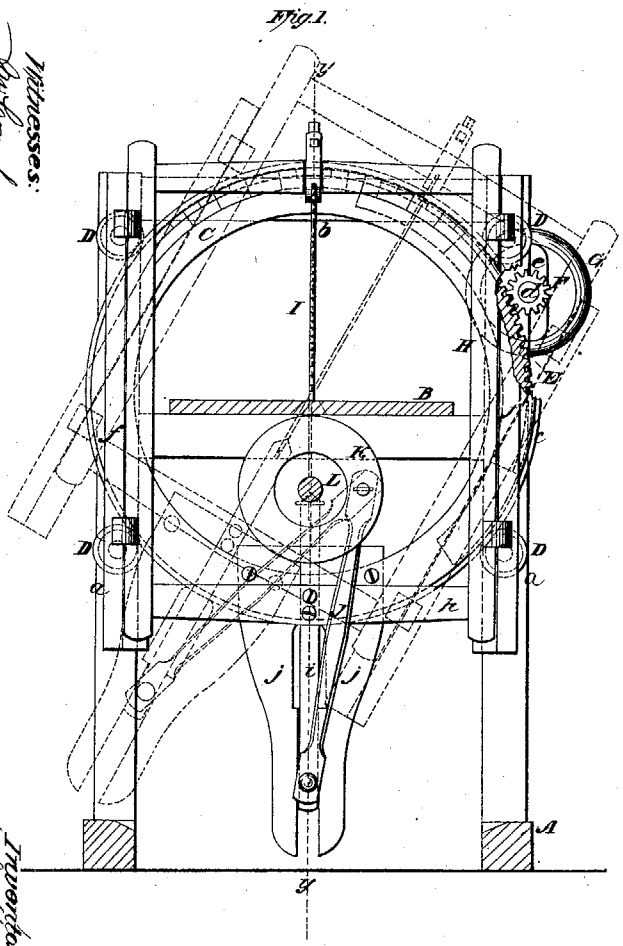
Witnesses:
Jno Crosby
G W Reed
Inventor:
J. L. Knowlton.
By Munn & Co.
Att'ys
A.M. PHOTO-LITHO. CO. N.Y. (OSBORNE'S PROCESS)

UNITED STATES PATENT OFFICE.

JOHN L. KNOWLTON, OF PHILADELPHIA, PENNSYLVANIA.

IMPROVEMENT IN SAW-MILLS.

Specification forming part of Letters Patent No. 40,344, dated October 20, 1863; Reissue No. 2,072, dated September 12, 1865.

*To all whom it may concern:*

Be it known that I, JOHN L. KNOWLTON, formerly of Bordentown, in the county of Burlington and State of New Jersey, but now of the city of Philadelphia, in the State of Pennsylvania, have invented a new and Improved Machine for Sawing Timber in Curved and Beveled Forms, such as Ship-Timber; and I do hereby declare that the following is a full, clear, and exact description of the same, reference being had to the accompanying drawings, making a part of this specification, in which—

Figure 1 is a front sectional view of the machine, taken in the line *x x* of Fig. 2; and Fig. 2 is a side sectional view of the machine, taken in the line *y y* of Fig. 1.

Similar letters of reference, where they occur in the separate figures, denote like parts of the machine in both of the drawings.

The object and purpose of my invention is to obtain a sawing-machine of simple construction for sawing ship or other timber in a straight, curved, or beveled form, and that can be readily adjusted and manipulated without liability to the friction or cramping hitherto incident to this class of machines, and which rendered them comparatively inoperative, or of no practical use; and my invention consists, first, in combining with the circular frame that holds and carries round with it when moved the saw sash or frame, guides for controlling and carrying around with it the sliding block through which motion is communicated to the saw, keeping said sliding block always in line with the saw, and thus preventing friction or cramping or binding of the moving parts, which hitherto has been so detrimental to this class of sawing-machines; and my invention further consists in arranging the shaft or journal of the crank-wheel or crank so that, if produced, it would pass through the opening of the circular frame, and allow the two to freely turn when the saw or its sash is turned to change the line of cut, and prevent binding or cramping in the transmission of the force that is to drive the saw, and to give the machine a compact form of construction.

To enable others skilled in the art to make and use my invention, I will proceed to describe the same with reference to the drawings.

A represents a frame, which supports a horizontal bed, B, and *a a* are two uprights, one being at each side of the framing, and connected at their upper ends by a cross-bar, *b*.

C represents a ring, which may be of wood or metal—cast-iron would be the preferable material. This ring C is provided at its periphery with a flange, *c*, which fits or moves between friction-rollers, D, attached to the uprights *a a*, two to each upright, said rollers having grooves in their peripheries for the flange *c* to move in, and thus guide and direct the ring in its movement.

The front or face side of the ring C is graduated into degrees or measured marks, as shown in Fig. 1, and at the back of the ring there is a sector-rack, E, into which a pinion, F, gears, said pinion being arranged on a shaft, *d*, which is furnished with a hand-wheel, G, by which it and the ring may be turned at pleasure in either direction. The shaft *d* has its bearings at *e*, attached to one of the uprights *a*.

To the ring C there are attached two parallel guides, *f f*, said guides being at opposite sides of the ring, and between these guides a saw frame or sash, H, is fitted so that it may work freely. I is the saw, which is secured to the frame or sash in the usual or any proper way, said saw moving through an opening, *g*, in the bed B.

The lower cross-bar, *h*, of the frame or sash H is attached to a sliding bar or block, *i*, which is fitted to run between pendent guides *j j*, attached to the lower part of the ring C, and the slide *i* is connected at its lower end by a pitman, J, to a wrist on the crank-wheel K, placed on the inner end of a driving-shaft, L, which is in a plane that would pass through the opening in the ring C, and should be as near the central plane of the ring as possible, having due consideration for the passage of the timber as it is fed up to and past the saw. The object of so placing the shaft L with regard to the ring C is that when the ring is moved or turned the shaft may also turn, and as nearly as practical upon centers that have a plane in common, and thus prevent binding or cramping and undue friction in transmitting power from the shaft to the saw-gate.

When the shaft L is rotated by any convenient power, it imparts a reciprocating motion to the saw frame or sash H by means of the crank-wheel K, pitman J, and sliding bar *i*. The timber to be sawed is placed upon the bed B, and fed up to the saw by hand or by any other suitable feed mechanism, and the saw I, while in operation, as well as at rest, may be adjusted in any inclined position, either to the right or left, to suit the bevel required to be given to the timber, and as this bevel in ship-timber is continually varying the saw I, may be moved or adjusted accordingly by simply turning the hand-wheel G, the pinion F on the shaft *d* and the sector-rack E on the ring C causing the latter to turn and to turn the saw I with it. As the ring turns, the guides *j j* also turn, as they are connected to the ring, and said guides in turning carry the sliding block *i* with them and keep said block always in the same plane with the saw, so that the power to drive the saw may be transmitted to it in a line with its motion, and hence without undue friction. Besides the capacity of the saw to cut in beveled or oblique lines, it can cut in vertical lines when necessary to do so.

The graduated front of the ring C serves as a guide to the adjustment of the saw while the timber is marked at different points indicating the bevel that is to be given it.

The wrist-pin of the crank-wheel K turns as near the under side of the table B as practicable, so that it and its shaft L shall be as near the imaginary center of the ring-frame C as the construction will admit of in view of the proper cutting action of the saw in the timber, and the space to feed the timber through.

Having thus fully described my invention, what I claim therein as new, and desire to secure by Letters Patent, is—

1. In combination with the circular frame that holds and turns the saw sash or frame, the guides *j j*, between which the sliding block moves that transmits motion to the saw, so that the saw and the block shall always be in the same plane and always move together without cramping or binding, substantially as and for the purpose herein set forth.

2. So arranging the crank-wheel shaft and the ring-frame as that the former will be in a plane that shall pass through the opening of the ring-frame, and as nearly central to said ring as practical with my construction, so that the two while connected may move on as nearly common centers as possible to avoid all binding of the parts, and all undue friction to the driving mechanism, substantially as herein described.

JOHN L. KNOWLTON.

Witnesses:
PAUL OESTERLE,
GEO. R. REINHART.